United States Patent
Leong et al.

(10) Patent No.: US 9,177,598 B2
(45) Date of Patent: Nov. 3, 2015

(54) DEVICE, METHOD OF FABRICATING A MEDIA AND METHOD OF SERVO WRITING

(71) Applicant: MARVELL INTERNATIONAL LTD., Hamilton (BM)

(72) Inventors: Siang Huei Leong, Singapore (SG); Zhimin Yuan, Singapore (SG); Bo Liu, Singapore (SG); Joo Boon Marcus Lim, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/684,033

(22) Filed: Nov. 21, 2012

(65) Prior Publication Data

US 2013/0128377 A1    May 23, 2013

(30) Foreign Application Priority Data

Nov. 21, 2011    (SG) .................................. 201108623

(51) Int. Cl.
| | |
|---|---|
| G11B 21/02 | (2006.01) |
| G11B 5/127 | (2006.01) |
| G11B 5/82 | (2006.01) |
| G11B 5/02 | (2006.01) |
| G11B 5/596 | (2006.01) |
| G11B 5/66 | (2006.01) |
| G11B 5/64 | (2006.01) |
| G11B 5/73 | (2006.01) |

(52) U.S. Cl.
CPC ...... *G11B 21/02* (2013.01); *G11B 5/02* (2013.01); *G11B 5/127* (2013.01); *G11B 5/59638* (2013.01); *G11B 5/64* (2013.01); *G11B 5/66* (2013.01); *G11B 5/7325* (2013.01); *G11B 5/82* (2013.01)

(58) Field of Classification Search
None
See application file for complete search history.

(56) References Cited

U.S. PATENT DOCUMENTS

| | | | | |
|---|---|---|---|---|
| 4,287,540 | A * | 9/1981 | Cheatham et al. | 360/18 |
| 4,313,140 | A * | 1/1982 | Keidl | 360/77.01 |
| 4,903,151 | A * | 2/1990 | Mizukami et al. | 360/78.01 |
| 5,055,951 | A * | 10/1991 | Behr | 360/77.12 |
| 5,119,248 | A * | 6/1992 | Bizjak et al. | 360/75 |
| 5,333,140 | A * | 7/1994 | Moraru et al. | 714/719 |
| 5,568,331 | A * | 10/1996 | Akagi et al. | 360/77.07 |
| 7,149,047 | B1 * | 12/2006 | Boutaghou | 360/77.03 |
| 7,453,661 | B1 * | 11/2008 | Jang et al. | 360/75 |
| 2011/0249359 | A1 * | 10/2011 | Mochizuki et al. | 360/75 |
| 2013/0057981 | A1 * | 3/2013 | Urakami et al. | 360/125.03 |

* cited by examiner

*Primary Examiner* — Andrew L Sniezek

(57) ABSTRACT

A device may be provided. The device includes a media including a servo layer and a data recording layer, and a recording head including a dimension sized to produce a magnetic writing field to write servo information on the servo layer.

20 Claims, 23 Drawing Sheets

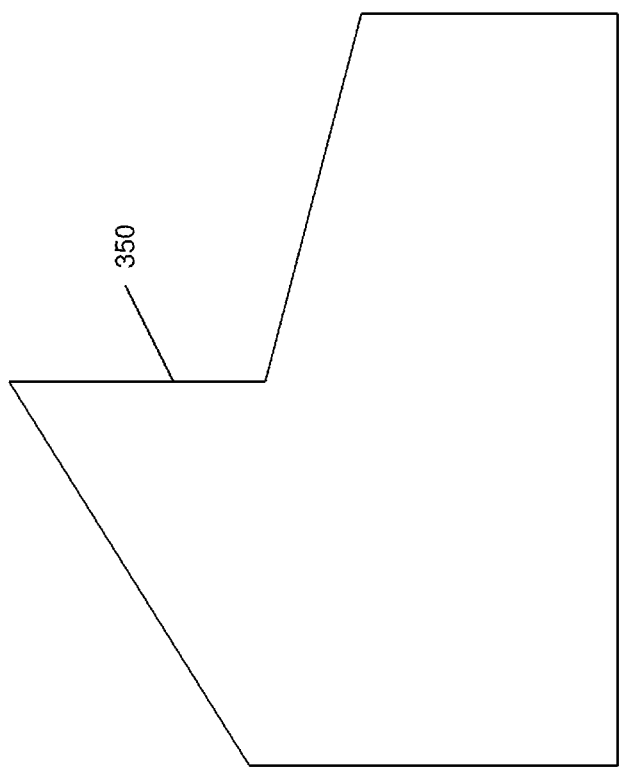

DEVICE, METHOD OF FABRICATING A MEDIA AND METHOD OF SERVO WRITING

CROSS-REFERENCE TO RELATED APPLICATION

This application claims the benefit of priority of Singapore Patent Application No. 201108623-8, filed 21 Nov. 2011, the contents of which being hereby incorporated by reference in its entirety for all purposes.

TECHNICAL FIELD

Various embodiments relate generally to a device, a method of fabricating a media, and a method of servo writing.

BACKGROUND

A conventional magnetic recording media has all the servo information buried in a magnetic data layer. The servo information may be overwritten during a writing process of recording data on the magnetic data layer.

FIG. 1 shows a dedicated servo media 100 having a magnetic data layer 102, and a physically separate magnetic layer as a dedicated servo layer 104 for storing the servo information. However, a writing field from a recording/writing head 106 may affect both the magnetic data layer 102 and the dedicated servo layer 104. In other words, the servo information in the servo layer 104 may be overwritten by the writing field.

Thus, it is desirable that the servo layer 104 has a nucleation field which is high enough to be unaffected by the writing field for writing data on the magnetic data layer 102 (in other words, unlimited writing on the magnetic data layer 102). Therefore, the switching field of the servo layer 104 should be large so that it is harder to write on the servo layer 104 than the magnetic data layer 102.

Further, it is also desirable to place the servo layer 104 below the magnetic data layer 102. The servo layer 104 is arranged further from the recording/writing head 106 than the magnetic data layer 102. The head field decay to the servo layer 104 is larger due to the larger magnetic space from the recording/writing head 106 to the servo layer 104. The head field decay to the servo layer 104 may still be large even if a soft underlayer 108 is arranged below the servo layer 104.

As such, it becomes more difficult to write servo information onto the servo layer 104. A conventional recording/writing head may not be able to write servo information onto the servo layer 104 without using energy assisted writing. Further, energy assisted writing may pose complexities and problems for writing onto the servo layer 104. A special energy assist recording/writing head may not be readily available.

SUMMARY

According to one embodiment, a device is provided. The device includes a media including a servo layer and a data recording layer, and a recording head including a dimension sized to produce a magnetic writing field to write servo information on the servo layer.

According to another embodiment, a method of fabricating a media is provided. The method includes depositing a servo layer above a substrate, writing servo information on the servo layer, and depositing a data recording layer above the servo layer after servo information is written on the servo layer.

According to another embodiment, a method of servo writing is provided. The method includes fabricating a media including a servo layer and a data recording layer, wherein the data recording layer is disposed above the servo layer, and writing servo information on the servo layer after the media is fabricated.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 3a to 3c shows different configurations of a recording head of a device according to one embodiment.

DETAILED DESCRIPTION

Embodiments of a device, a method of fabricating a media and a method of servo writing will be described in detail below with reference to the accompanying figures. It will be appreciated that the embodiments described below can be modified in various aspects without changing the essence of the invention.

In the context of various embodiments, in a dedicated servo implementation, a servo layer is dedicated to store the position data referred to as servo data or servo signal. The servo layer may be a buried layer arranged beneath a data recording layer and may have a perpendicular or a longitudinal magnetization orientation for providing magnetic information for determining the location of the recording head in relation to the storage media. The servo information is provided on the servo layer distinct from the data recording layer so as to allow continuously available servo readback to enable continual position feedback thereby providing continual location detection without utilizing any of the recording layer for location detection. This may provide higher positioning accuracy through continual location determination, while also removing the servo sectors/tracks from the recording layer, thereby increasing surface utilization of the storage space in the recording layer and further increasing the data recording density by increasing the track positioning accuracy. Alternatively, certain servo information can also remain on the data layer and servo information from both the data and servo layer can be used either together or separately for location determination.

In the context of various embodiments, the servo layer may include a plurality of concentric tracks for holding the servo information. Each servo track may be assigned or associated with a single frequency signal. Adjacent servo tracks may be assigned different frequencies. Repeated servo tracks may be assigned alternate frequencies. In the context of various embodiments, adjacent servo tracks mean tracks that are arranged side-by-side. In various embodiments, two adjacent servo tracks share a common boundary. Other servo schemes may also be used.

In the context of various embodiments, the term "head" may include a magnetic head. In addition, the "head" may refer to the read/write head for reading/writing information or data from/to a storage media. The head includes a reader and a writer. The head is positioned over a storage media and the reader may read signal or information from the storage media and the writer may write information to the storage media.

Figure 2A:
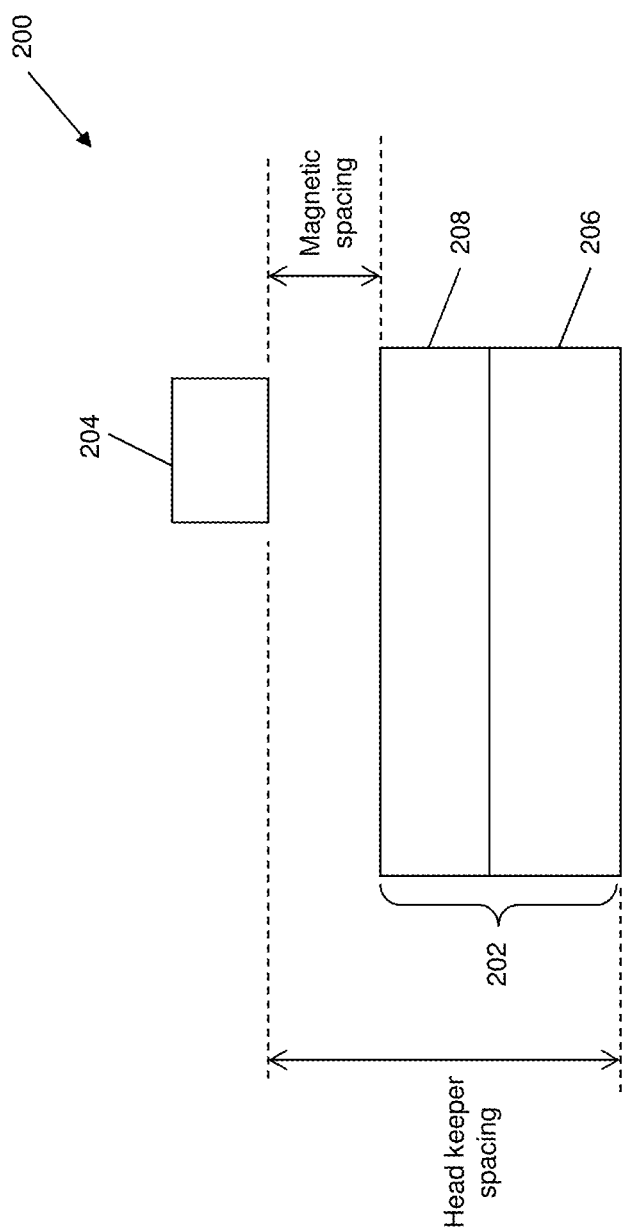
FIG. 2a shows a schematic diagram of a device according to one embodiment.

FIG. 2a shows a schematic diagram of a device 200 according to one embodiment. The device 200 includes a media 202 and a recording head 204. The media 202 includes a servo layer 206 and a data recording layer 208. The data recording layer 208 is disposed between the recording head 204 and the servo layer 206. The distance between the data recording layer 208 and the recording head 204 is smaller than the distance between the servo layer 206 and the recording head 204.

In one embodiment, the media 202 employs dedicated servo whereby a magnetic layer separate from the data recording layer 208 is used as the servo layer 206, which is dedicated to hold only servo information. No data is embedded on the servo layer 206. In one embodiment, the servo layer 210 and data recording layer 208 may be put on the same side and they may be read and/or processed together; this may also be referred to as dedicated servo.

Figure 2B:
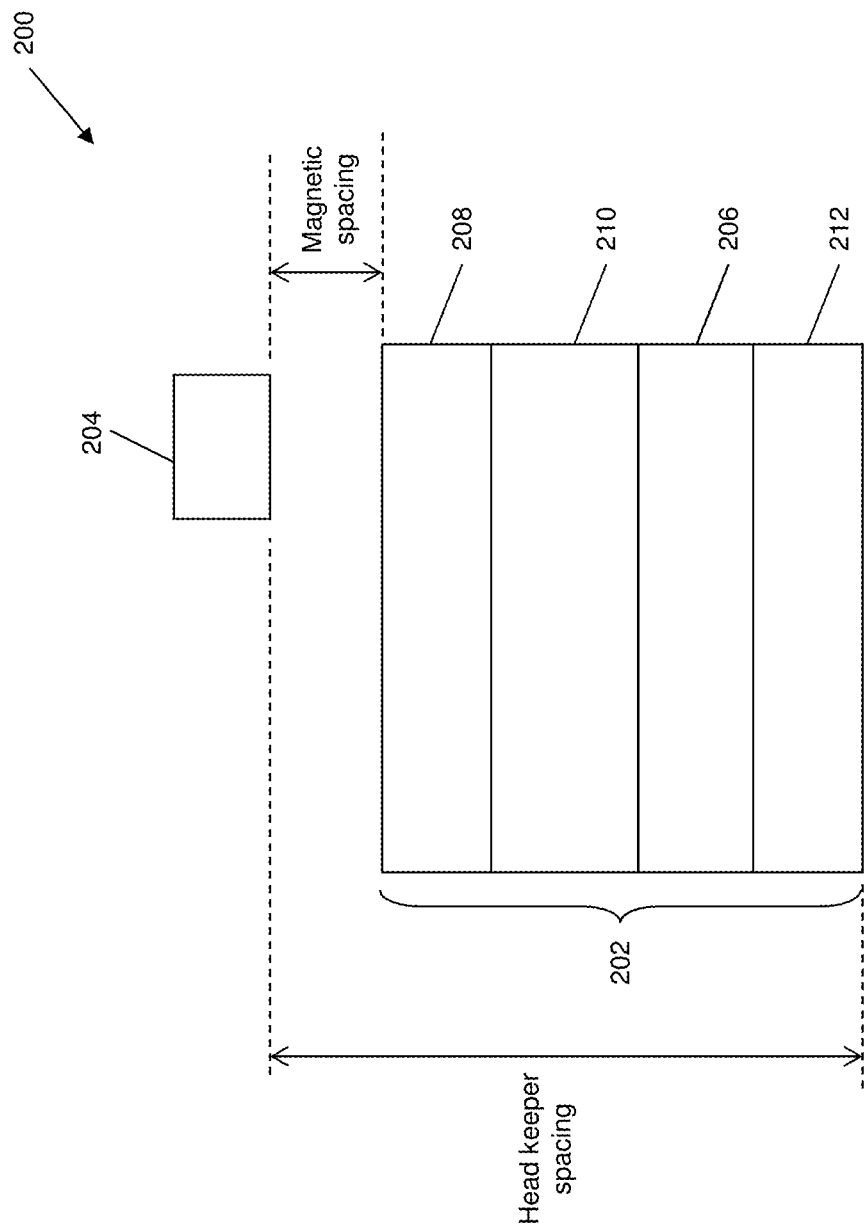
FIG. 2b shows a schematic diagram of a device according to one embodiment.

In one embodiment, as shown in FIG. 2b, the media 202 may further include a first intermediate layer 210 and a second intermediate layer 212. The first intermediate layer 210 may be disposed between the servo layer 206 and the data recording layer 208. The second intermediate layer 212 may be disposed below the servo layer 206 such that the servo layer 206 is arranged between the first intermediate layer 210 and the second intermediate layer 212.

In one embodiment, the servo layer 206 may have one or more layers. Adjacent layers of the servo layer 206 may be separated by an exchange control layer. The servo layer 206 may have a thickness ranging between about 10 nm to about 20 nm or more. The servo layer 206 may have a thickness of about 10 nm. In one embodiment, the data recording layer 208 may have one or more layers. Adjacent layers of the data recording layer 208 may be separated by an exchange control layer. The data recording layer 208 may have a thickness ranging between about 10 nm to about 20 nm or more. The data recording layer 208 may have a thickness of about 17 nm. In one embodiment, the first intermediate layer 210 and the second intermediate layer 212 may have one or more layers respectively. The first intermediate layer 210 may have a thickness of about 20 nm and the second intermediate layer 212 may have a thickness of about 20 nm. The second intermediate layer 212 may have a thickness of about 10 nm. In one embodiment, a magnetic spacing between the recording head 204 and the media 202 may range from about 2 nm to about 10 nm. The magnetic spacing may be about 6 nm. Different thickness of the servo layer 206, the data recording layer 208, the first intermediate layer 210 and the second intermediate layer 212 and different magnetic spacing can be used in other embodiments. A head keeper spacing which is the spacing between the recording head 204 and a magnetic soft underlayer (SUL) (not shown) may vary according to the thickness of the layers (e.g. the servo layer 206, the data recording layer 208, the first intermediate layer 210 and the second intermediate layer 212) above the SUL. The SUL may be disposed below the second intermediate layer 212. In one embodiment, the head keeper spacing may be about 63 nm.

In one embodiment, the recording head 204 has a dimension sized to produce a magnetic writing field to write servo information on the servo layer 206. The dimension may include a width (w) of the recording head 204. The dimension may also include a length (p) of the recording head 204.

In one embodiment, the recording head 204 has a larger width than conventional recording/writing heads. The recording head 204 may have a larger length than the conventional recording/writing heads. Depending on the application of the recording head 204 and the requirement for resulting track pitch, the width of the recording head 204 may range from sub-100 nm to around 500 nm. The recording head 204 may have a width beyond tens of microns. The length of the recording head 204 can vary and can be in general scales with the width. A width of a conventional recording head may be smaller than the width of the recording head 204 and range from sub-20 nm to less than about 200 nm.

The recording head 204 can produce a stronger magnetic writing field and has a smaller head field decay as compared to the conventional recording/writing heads. Thus, the recording head 204 can write servo information on the servo layer 206 which has a large switching field. The recording head 204 can also write servo information on the servo layer 206 which is arranged at a large magnetic spacing from the recording head 204.

In addition, as compared to the conventional special energy assisted recording/writing heads, the recording head 204 is more readily available and can be easily designed and fabricated. Thus, design variations of the recording head 204 can be fabricated with ease.

Figure 3A:
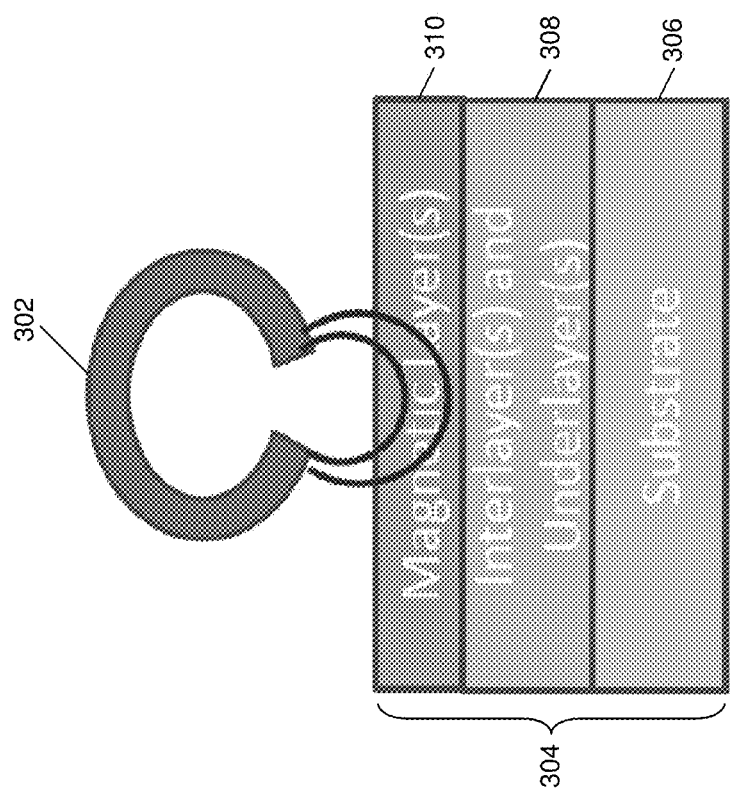
Figure 3B:
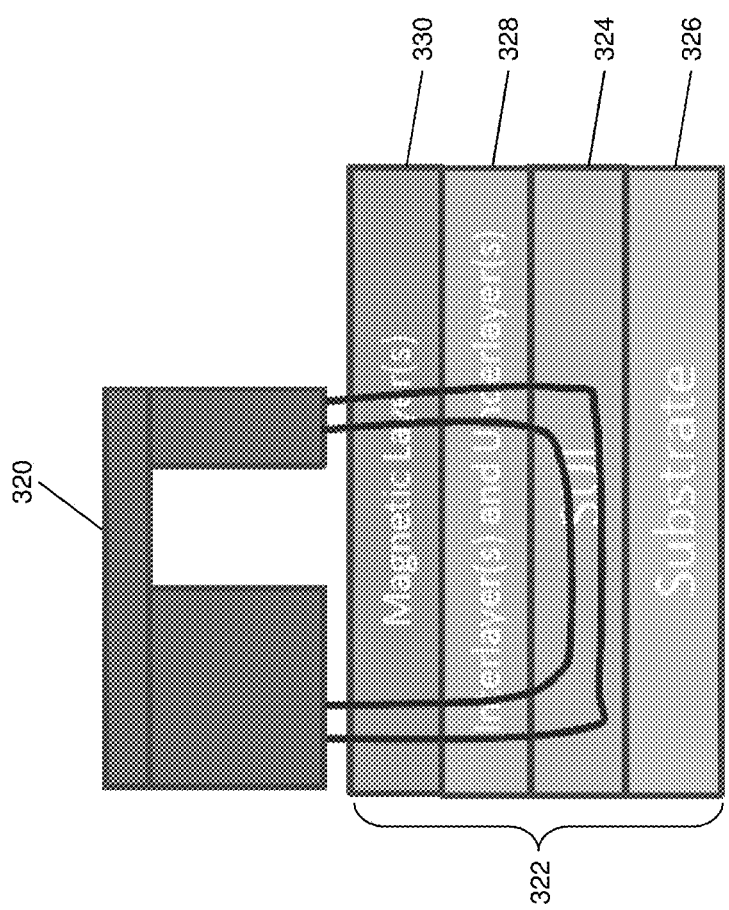

A magnetic writing field of the recording head 204 can be improved by using different configurations/designs of the recording head 204. In one embodiment, the recording head 204 is a longitudinal ring recording head 302 as shown in FIG. 3a. In another embodiment, the recording head 204 is a single pole perpendicular magnetic recording head 320 as shown in FIG. 3b. In yet another embodiment, the recording head 204 is a shingled recording head 350 as shown in FIG. 3c. Other configurations/designs of the recording head 204 can be used in different embodiments.

The magnetic writing field of the recording head 204 can be improved by using a soft under-layer (SUL). The soft under-layer (not shown) may be disposed below the second intermediate layer 212 of the media 202 such that the second intermediate layer 212 is disposed between the soft under-layer and the servo layer 206 (see FIG. 2b). Different types of recording heads 204 are used depending on the arrangements of the media 202.

FIG. 3a shows that the longitudinal ring recording head 302 is used for an exemplary media 304 without a soft under-layer or having a less effective soft under-layer. The exemplary media 304 includes a substrate 306, interlayer(s) and underlayer(s) 308 and magnetic layer(s) 310 (e.g. servo layer). The interlayer(s) and underlayer(s) 308 are disposed between the substrate 306 and the magnetic layer(s) 310. The longitudinal ring recording head 302 is used because the horizontal/longitudinal component of the writing field of the longitudinal ring recording head 302 can help in writing data on magnetic layer(s) 310 (e.g. writing the servo information on the servo layer).

FIG. 3b shows that the single pole perpendicular magnetic recording head 320 is used for an exemplary media 322 having a soft under-layer 324. The exemplary media 322 further includes a substrate 326, interlayer(s) and underlayer(s) 328 and magnetic layer(s) 330 (e.g. servo layer). The soft under-layer 324 is disposed between the substrate 326 and the interlayer(s) and underlayer(s) 328. The magnetic layer(s) 330 is disposed above the interlayer(s) and underlayer(s) 328. The single pole perpendicular magnetic recording head 320 is used to make use of the benefit (e.g. enhance writing ability of the servo layer) of the soft under-layer 324.

Figure 4:
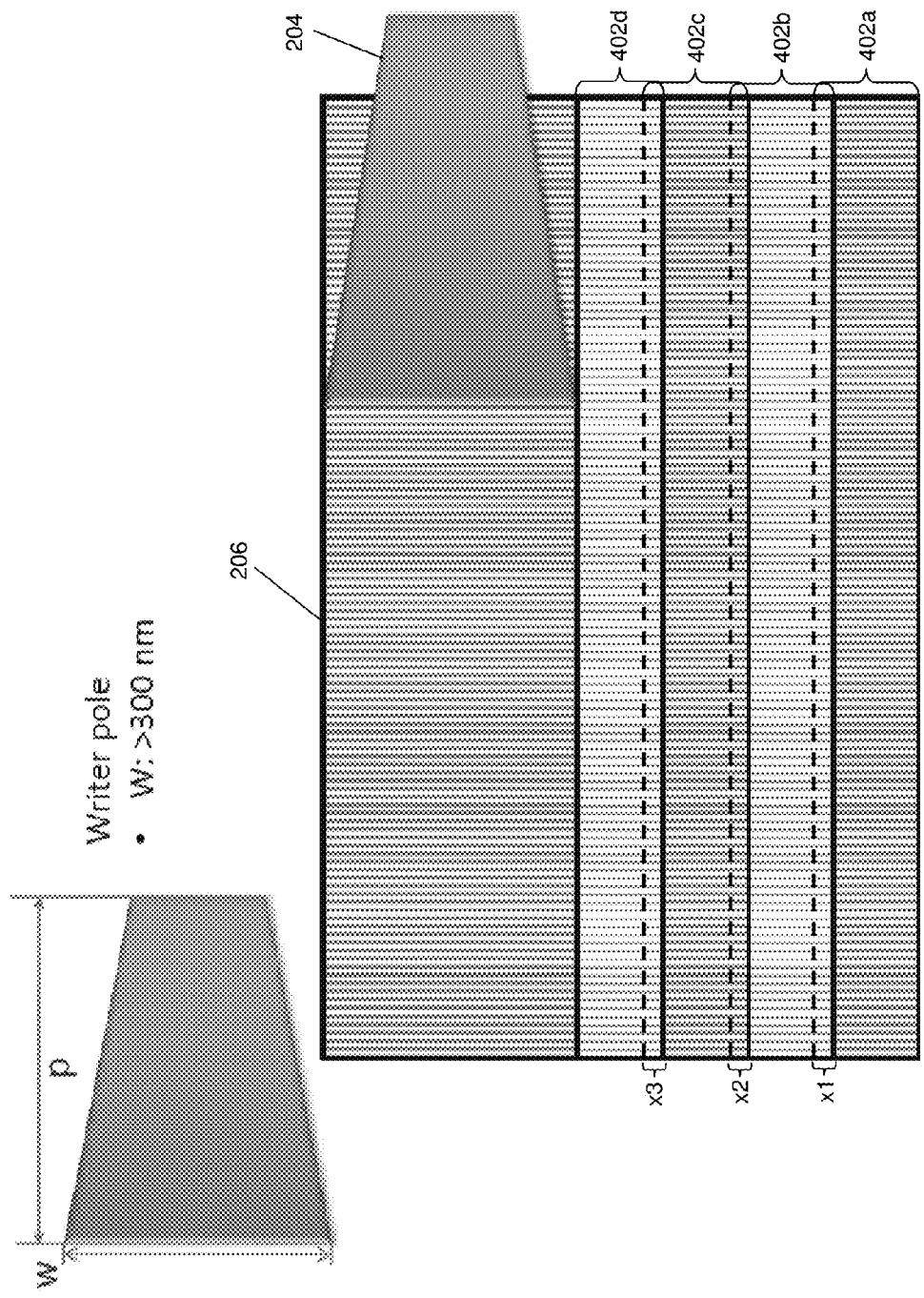
FIG. 4 shows a shingled writing scheme carried out by a recording head of a device according to one embodiment.

In one embodiment, the recording head 204 is configured to write servo information on the servo layer 206 using a shingled writing scheme as shown in FIG. 4. By using the shingled writing scheme, the servo tracks 402a, 402b, 402c, 402d written by the recording head 204 are overlapped in a sequential manner. A portion x1 of the first servo track 402a is overlapped by the second servo track 402b, a portion x2 of the second servo track 402b is overlapped by the third servo track 402c, and a portion x3 of the third servo track 402c is overlapped by the fourth servo track 402d.

This can overcome a possible problem of the track width resulting from the recording head 204 being larger than the desired track width of the servo tracks 402a, 402b, 402c, 402d. Further, the resulting track width obtained from the recording head 204 using the shingled writing scheme is narrower than that obtained from the recording head 204 without using the shingled writing scheme.

Figure 5:
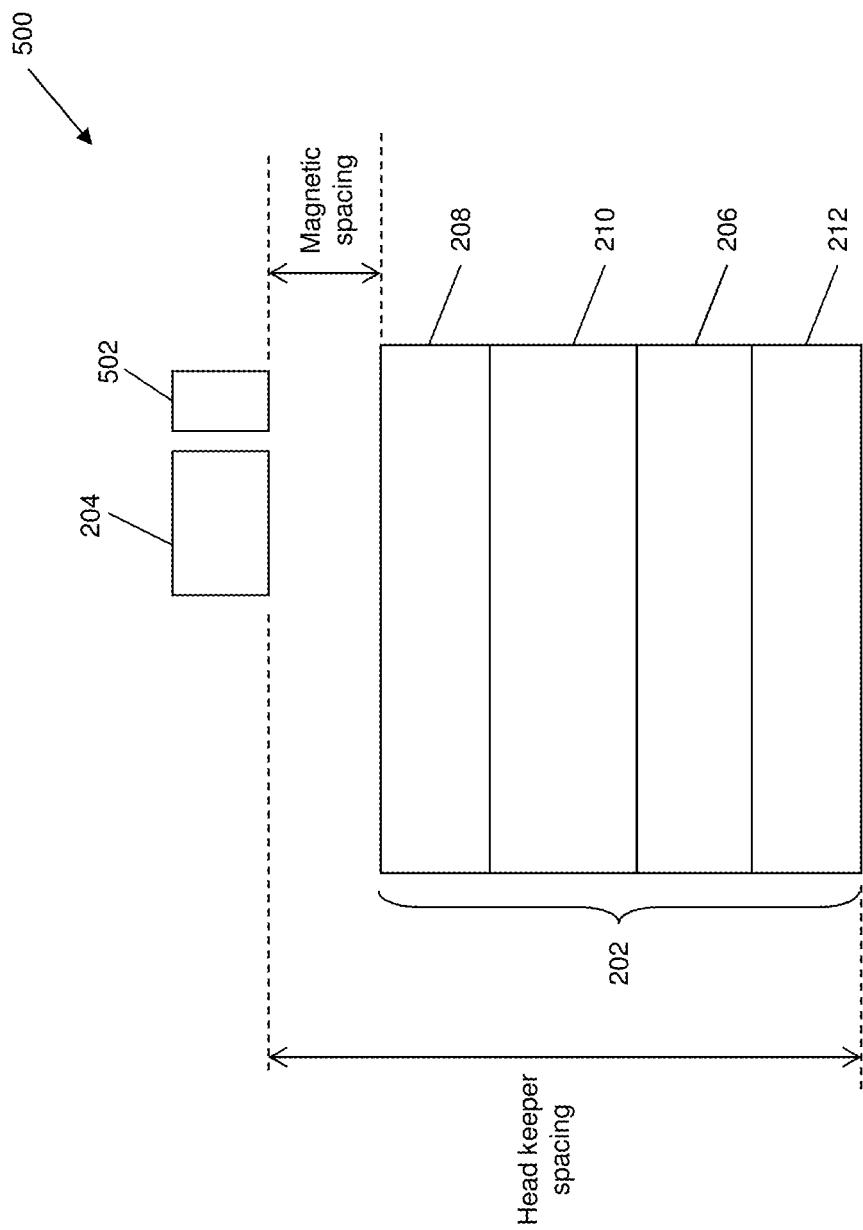
FIG. 5 shows a schematic diagram of a device according to one embodiment.

FIG. 5 shows a schematic diagram of a device 500. The device 500 may have a similar configuration/arrangement as the device 200, except that the device further includes a further recording head 502. The further recording head 502 is configured to produce a magnetic writing field to write data on the data recording layer 208. The further recording head 502 may have a smaller dimension than the recording head 204. For example, the further recording head 502 may have a smaller width and/or length than the recording head 204. As such, a high track density on the data recording layer 208 can be achieved by the further recording head 502.

The device 500 may be configured to adjust a writing current of the further recording head 502. The further recording head 502 may be configured to adjust the magnetic writing field when the writing current is adjusted. The writing current and the magnetic writing field may be reduced to respective values that are sufficient for writing data on the data recording layer 208 of a lower switching field. The magnetic writing field of the further recording head 502 may be smaller than the magnetic writing field of the recording head 204. Thus, erasure or overwriting of the servo information on the servo layer 206 of a higher switching field can be avoided.

In one embodiment, the further recording head 502 may be a disk certification head. Similarly, when carrying out disk certification, the writing current of the further recording head 502 may be adjusted or reduced. A smaller magnetic writing field resulted from the lower writing current allows writing of data on the data recording layer 208, but not on the servo layer 206.

In one embodiment, the device 200 of FIGS. 2a and 2b and the device 500 of FIG. 5 may include but are not limited to a data storage device, a disk servo writer, a spinstand, a disk certifier and a drag tester. A data storage device may be a hard disk drive (HDD).

Figure 6:
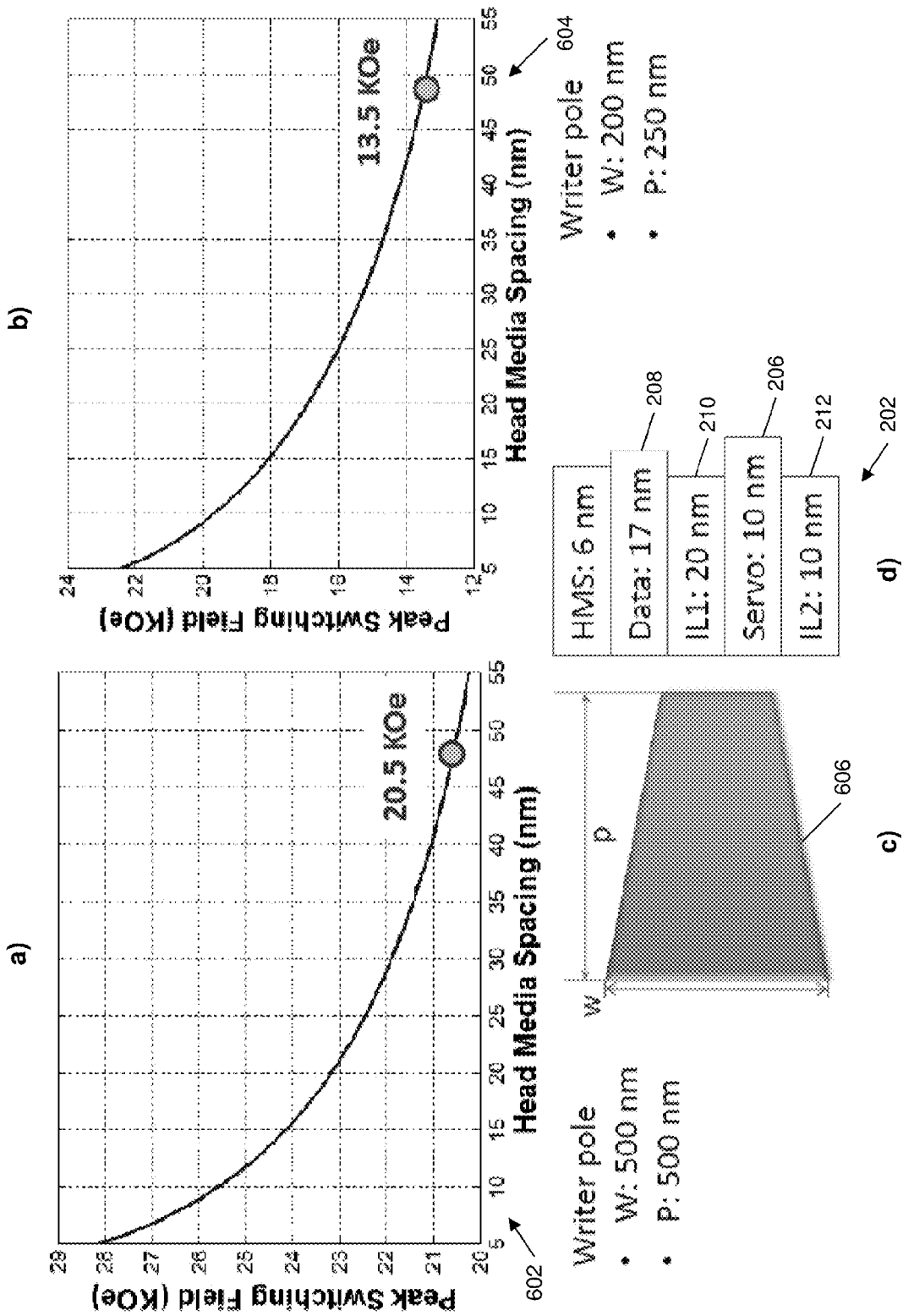
FIG. 6a shows a graph of peak switching field plotted against head media spacing for a recording head of a device according to one embodiment.
FIG. 6b shows a graph of peak switching field plotted against head media spacing for a conventional recording head.
FIG. 6c shows an exemplary shape of a conventional recording head and of a recording head of a device according to one embodiment.
FIG. 6d shows a schematic diagram of a media of a device according to one embodiment.

FIG. 6a shows a graph 602 of peak switching field plotted against head media spacing (i.e. magnetic spacing between a recording head and a media) for the recording head 204. FIG. 6b shows a graph 604 of peak switching field plotted against head media spacing for a conventional recording head.

FIG. 6c shows an exemplary shape 606 of the recording head 204 and the conventional recording head. The shapes and designs of the recording head 204 are different in other embodiments. In one embodiment, the recording head 204 has a width (w) of about 500 nm and a length (p) of about 500 nm. The conventional recording head has a width (w) of about 200 nm and a length (p) of about 250 nm.

FIG. 6d shows a schematic diagram of the media 202. The servo layer 206 has a thickness of about 10 nm. The data recording layer 208 has a thickness of about 17 nm. The first intermediate layer 210 has a thickness of about 20 nm and the second intermediate layer 212 has a thickness of about 10 nm.

The magnetic spacing between the recording head 204/the conventional recording head and the servo layer 206 of the media 202 may be about 48 nm. Graph 602 shows a peak switching field of about 20.5 KOe at a head media spacing of about 48 nm for the recording head 204. Graph 604 shows a peak switching field of about 13.5 KOe at a head media spacing of about 48 nm for the conventional recording head.

Further, comparing graph 602 and graph 604, graph 602 shows a smaller head field decay for the recording head 204.

Thus, the recording head 204 can produce a stronger magnetic writing field and has a smaller head field decay. The recording head 204 can write servo information on the servo layer 206 which has a large switching field. The recording head 204 can also write servo information on the servo layer 206 which is arranged at a large magnetic spacing from the recording head 204.

Figure 7:
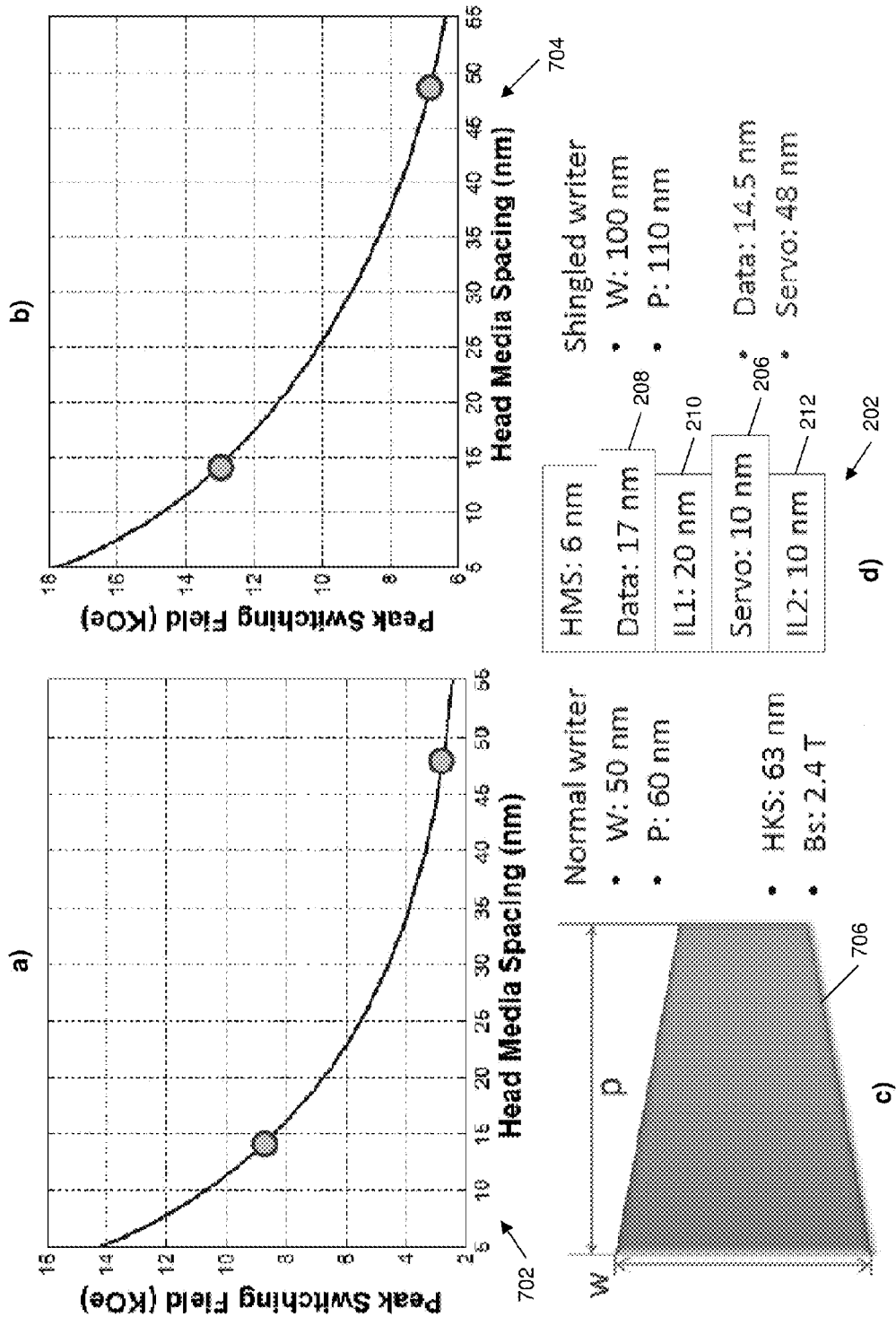
FIG. 7a shows a graph of peak switching field plotted against head media spacing for a conventional recording head.
FIG. 7b shows a graph of peak switching field plotted against head media spacing for a recording head of a device according to one embodiment.
FIG. 7c an exemplary shape of a conventional recording head and of a recording head of a device according to one embodiment.
FIG. 7d shows a schematic diagram of a media of a device according to one embodiment.

FIG. 7a shows a graph 702 of peak switching field plotted against head media spacing (i.e. magnetic spacing between a recording head and a media) for a conventional recording head. FIG. 7b shows a graph 704 of peak switching field plotted against head media spacing for the recording head 204.

FIG. 7c shows an exemplary shape 706 of the recording head 204 and the conventional recording head. The shapes and designs of the recording head 204 are different in other embodiments. In one embodiment, the recording head 204 has a width (w) of about 100 nm and a length (p) of about 110 nm. The conventional recording head has a width (w) of about 50 nm and a length (p) of about 60 nm.

FIG. 7d shows a schematic diagram of the media 202. The servo layer 206 has a thickness of about 10 nm. The data recording layer 208 has a thickness of about 17 nm. The first intermediate layer 210 has a thickness of about 20 nm and the second intermediate layer 212 has a thickness of about 10 nm.

The magnetic spacing between the recording head 204/the conventional recording head and the data recording layer 208 of the media 202 may be about 14.5 nm. The magnetic spacing between the recording head 204/the conventional recording head and the servo layer 206 of the media 202 may be about 48 nm. Comparing graph 702 and graph 704, it can be observed that the recording head 204 have a higher magnetic field at both the magnetic spacings of about 14.5 nm and about 48 nm than the conventional recording head. Further, the recording head 204 has a smaller head field decay than the conventional recording head.

Therefore, the recording head 204 can produce a stronger magnetic writing field and has a smaller head field decay. The recording head 204 can write on media with high coercivity or on any magnetic layer arranged at a further distance from the recording head 204.

Comparing graph 602 of FIG. 6a and graph 704 of FIG. 7b, it can be observed that the magnetic field of the recording head 204 is higher when the recording head 204 has a larger dimension (i.e. a larger width and length).

Figure 8A:
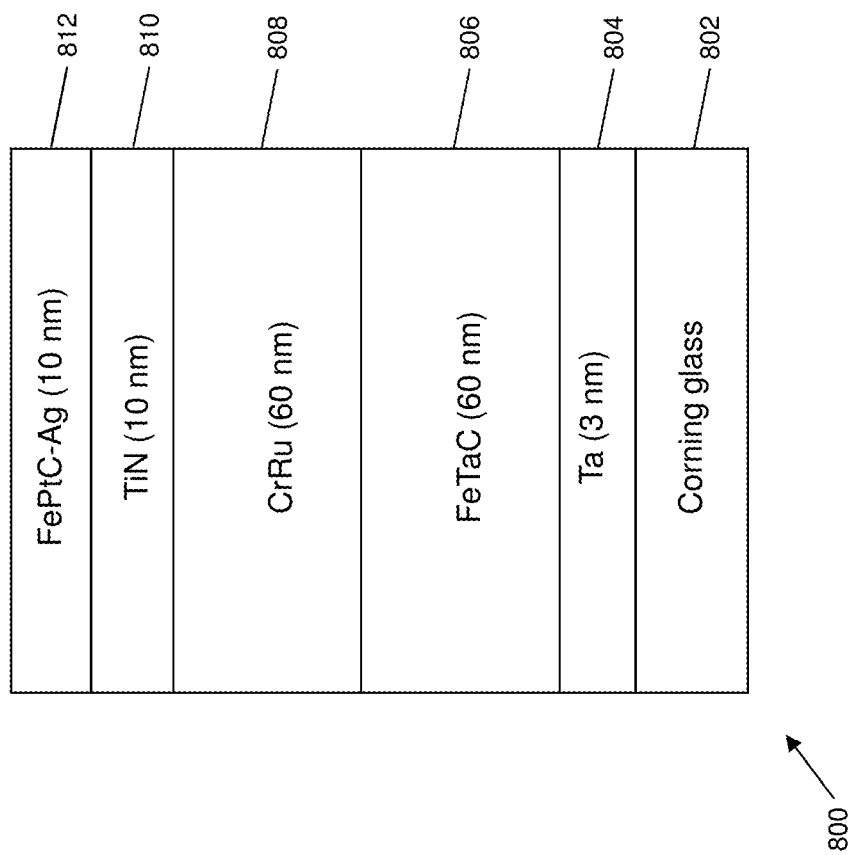
FIG. 8a shows a schematic diagram of an exemplary media according to one embodiment.

In one embodiment, the recording head 204 can be used in a drag tester for writing on a media of a high coercivityswitching field. FIG. 8a shows a schematic diagram of a media 800 of a high coercivityswitching field. The media 800 includes a substrate 802, an adhesion layer 804 disposed above the substrate 802, a magnetic soft under-layer (SUL) 806 disposed above the adhesion layer 804, a seed layer 808 disposed above the SUL 806, a intermediate layer 810 disposed above the seed layer 808, and a data recording layer 812 disposed above the intermediate layer 810.

In one embodiment, the substrate 802 may include corning glass. The adhesion layer 804 may include tantalum and may have a thickness of about 3 nm. The SUL 806 may include iron-tantalum-carbon and may have a thickness of about 60 nm. The seed layer 808 may include chromium-ruthenium and may have a thickness of about 60 nm. The intermediate layer 810 may include titanium-nickel and may have a thickness of about 10 nm. The data recording layer 812 may include iron-platinum-carbon-silver and may have a thickness of about 10 nm.

Figure 8B:
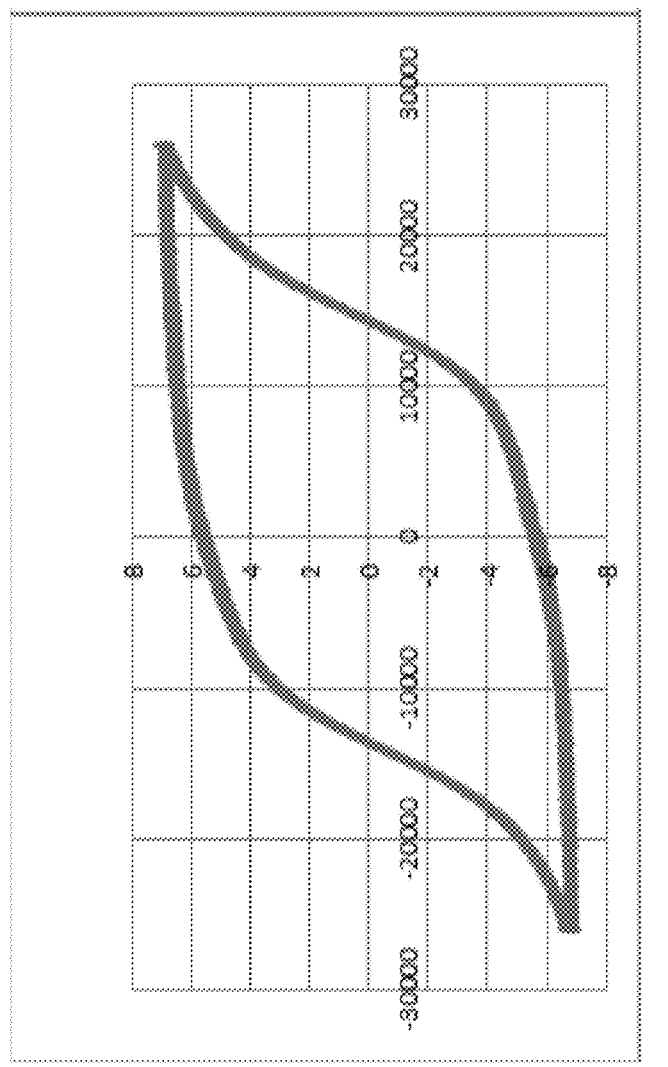
FIG. 8b shows a plot of a hysteresis loop of an exemplary media according to one embodiment.
Figure 8:
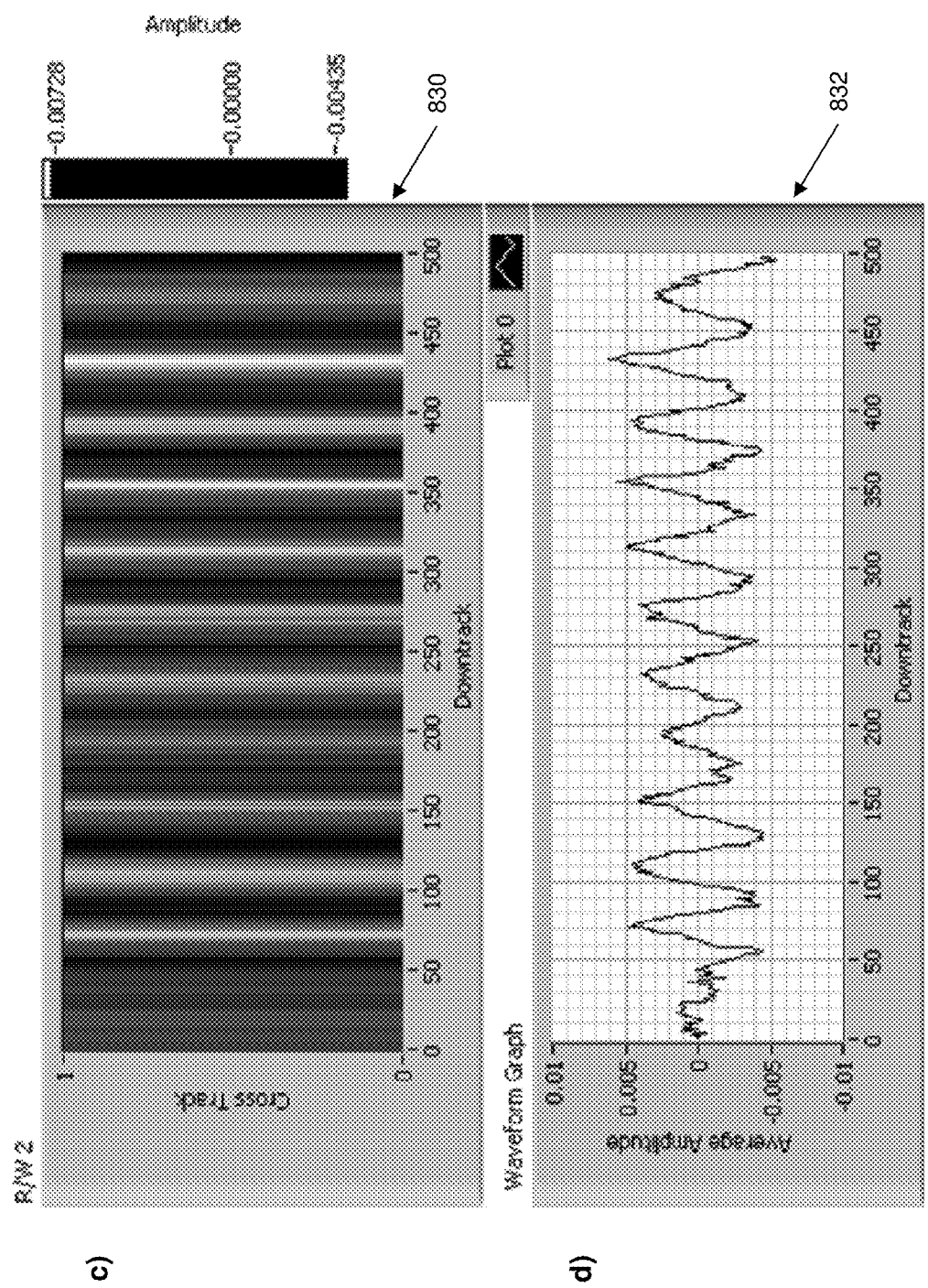
FIG. 8c shows a plot of cross track position plotted against down track position for a writing process carried out by a recording head on a media according to one embodiment.
FIG. 8d shows a plot of average readback voltage amplitude plotted against down track position for a writing process carried out by a recording head on a media according to one embodiment.
FIG. 8e shows a plot of cross track position plotted against down track position for a writing process carried out by a recording head on a media with assisted energy scheme according to one embodiment.
FIG. 8f shows a plot of average readback voltage amplitude plotted against down track position for a writing process carried out by a recording head on a media with assisted energy scheme according to one embodiment.
FIG. 8g shows a plot of cross track position plotted against down track position for a writing process carried out by a recording head on a media according to one embodiment.
FIG. 8h shows a plot of average readback voltage amplitude plotted against down track position for a writing process carried out by a recording head on a media according to one embodiment.
FIG. 8i shows a plot of cross track position plotted against down track position for a writing process carried out by a recording head on a media with assisted energy scheme according to one embodiment.
FIG. 8j shows a plot of average readback voltage amplitude plotted against down track position for a writing process carried out by a recording head on a media with assisted energy scheme according to one embodiment.
Figure 8:
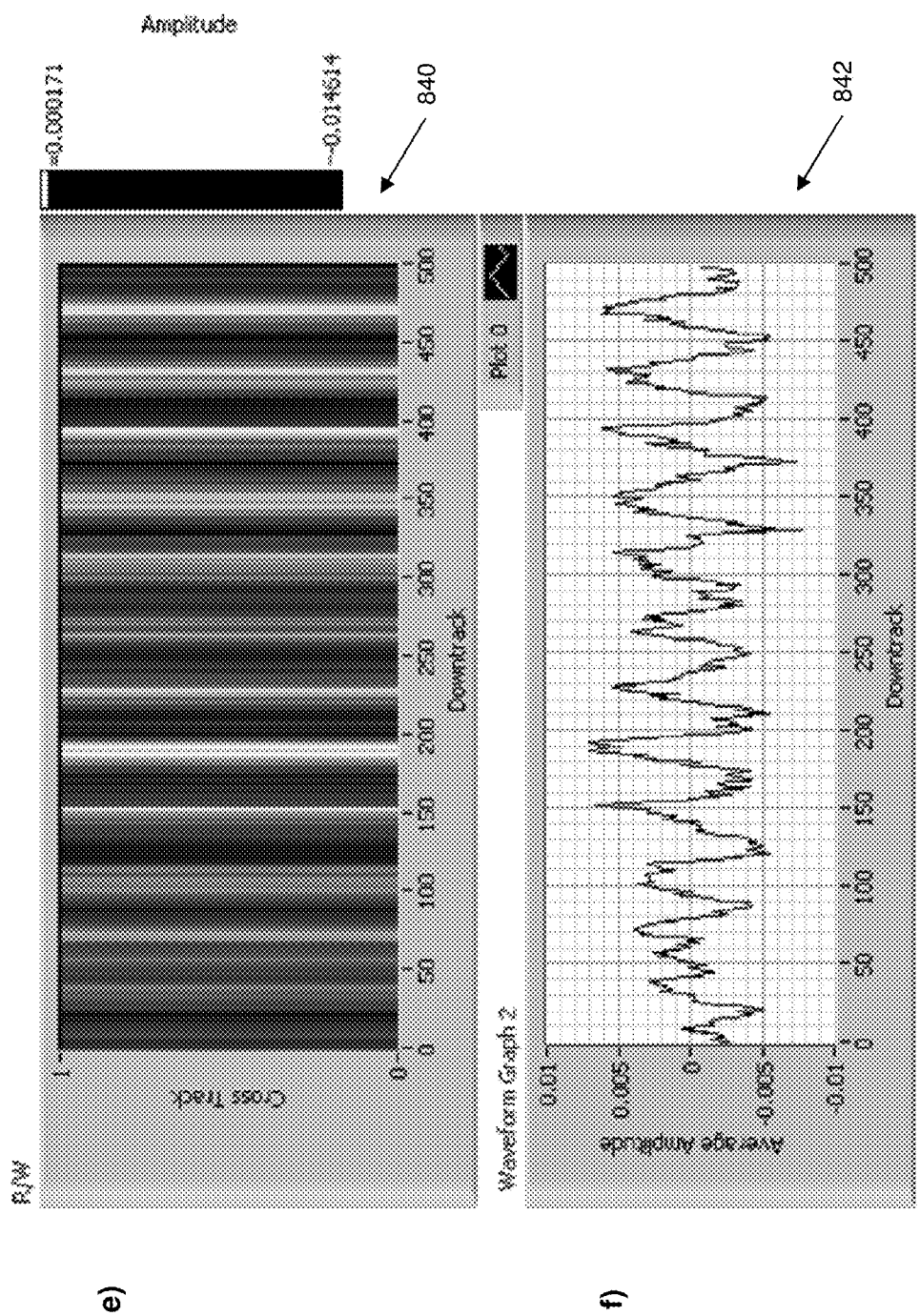
Figure 8:
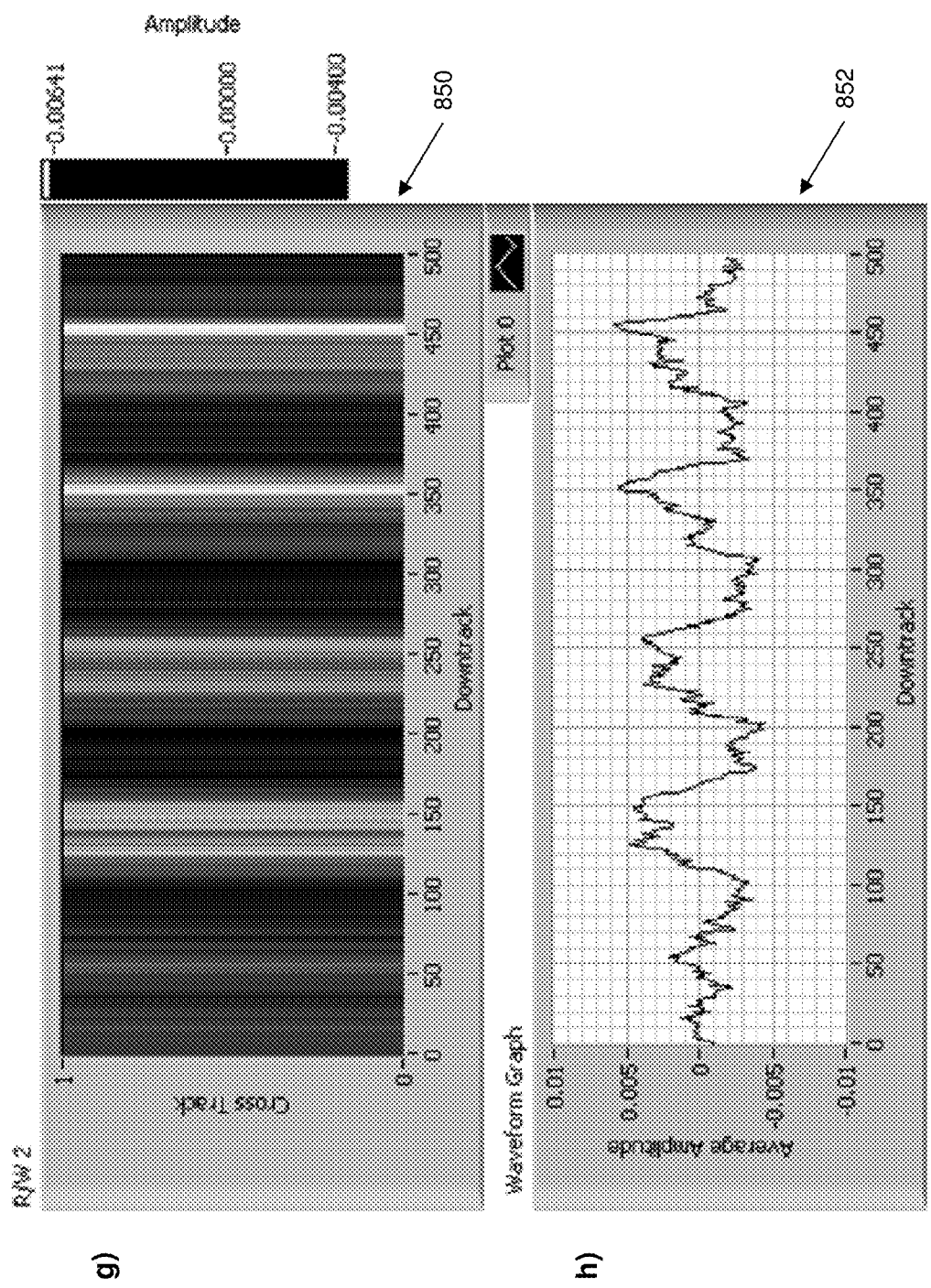
Figure 8:
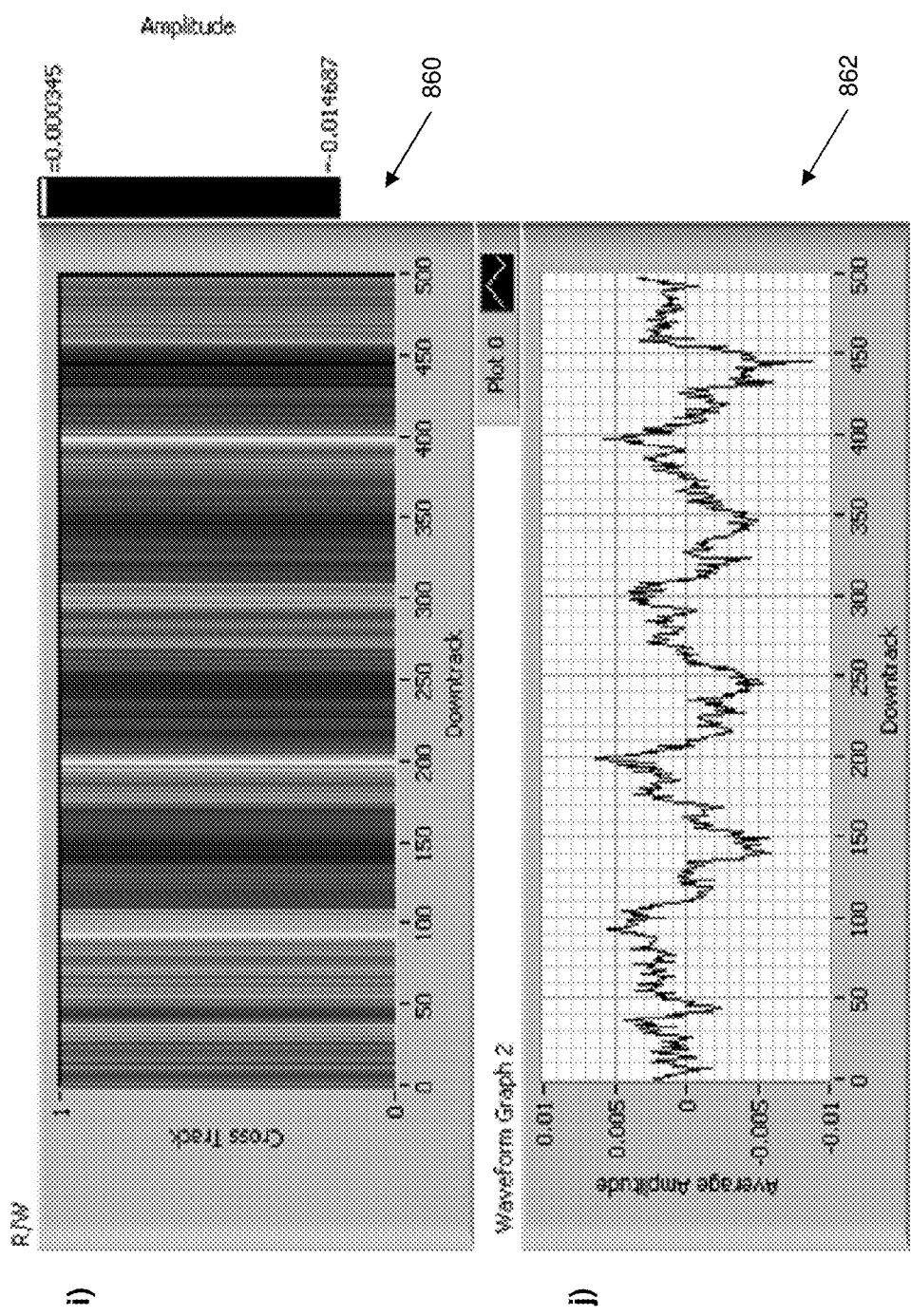

FIG. 8b shows a plot 820 of a hysteresis loop of the media 800. The coercivity $H_c$ of the media 800 is about 13,960 Oe.

FIG. 8c shows a plot 830 of cross track position plotted against down track position for a writing process carried out by the recording head 204 on the media 800. FIG. 8d shows a plot 832 of average readback voltage amplitude plotted against down track position for a writing process carried out by the recording head 204 on the media 800. In one embodiment, the length of each bit of data is about 2 μm in down track direction on the media 800. Plot 832 indicates the ability of the recording head 204 to successfully write on high coercivity media.

FIG. 8e shows a plot 840 of cross track position plotted against down track position for a writing process carried out by the recording head 204 on the media 800 with assisted energy scheme. FIG. 8f shows a plot 842 of average readback voltage amplitude plotted against down track position for a writing process carried out by the recording head 204 on the media 800 with assisted energy scheme. In one embodiment, the assisted energy scheme includes applying a temperature of about 50° C. on the media 800 during the writing process. The length of each bit of datainformation is about 2 μm in down track direction on the media 800. Comparing plot 842 of FIG. 8f and plot 832 of FIG. 8d, the application of energy assist in the form of raised temperature results in a larger average readback voltage amplitude shown in plot 842. This indicates that energy assist methods can help to further improve the writing capability of the recording head 204 in particular, when working with high coercivity media.

FIG. 8g shows a plot 850 of cross track position plotted against down track position for a writing process carried out by the recording head 204 on the media 800. FIG. 8h shows a plot 852 of average readback voltage amplitude plotted against down track position for a writing process carried out by the recording head 204 on the media 800. In one embodiment, the length of each bit of datainformation is about 5 μm in down track direction on the media 800.

FIG. 8i shows a plot 860 of cross track position plotted against down track position for a writing process carried out by the recording head 204 on the media 800 with assisted energy scheme. FIG. 8j shows a plot 862 of average readback voltage amplitude plotted against down track position for a writing process carried out by the recording head 204 on the media 800 with assisted energy scheme. In one embodiment, the assisted energy scheme includes applying a temperature of about 50° C. on the media 800 during the writing process. The length of each bit of datainformation is about 5 μm in down track direction on the media 800. Looking at plot 852 of FIG. 8h and plot 862 of FIG. 8j where the bit length is about 5 μm, it can be observed that the positive effect of energy assist or increased temperature is not as evident (e.g. no significant increase in the average readback voltage amplitude) as compared to the case when the bit length is about 2 μm (plot 832 of FIG. 8d and plot 842 of FIG. 8f). The positive effect of energy assist on the writing capability of the recording head 204 is therefore larger at smaller bit lengths.

The recording head 204 can write datainformation on a media of a high coercivityswitching field. Further, the writing process can be improved if a soft under-layer is used in a media.

Figure 9A:
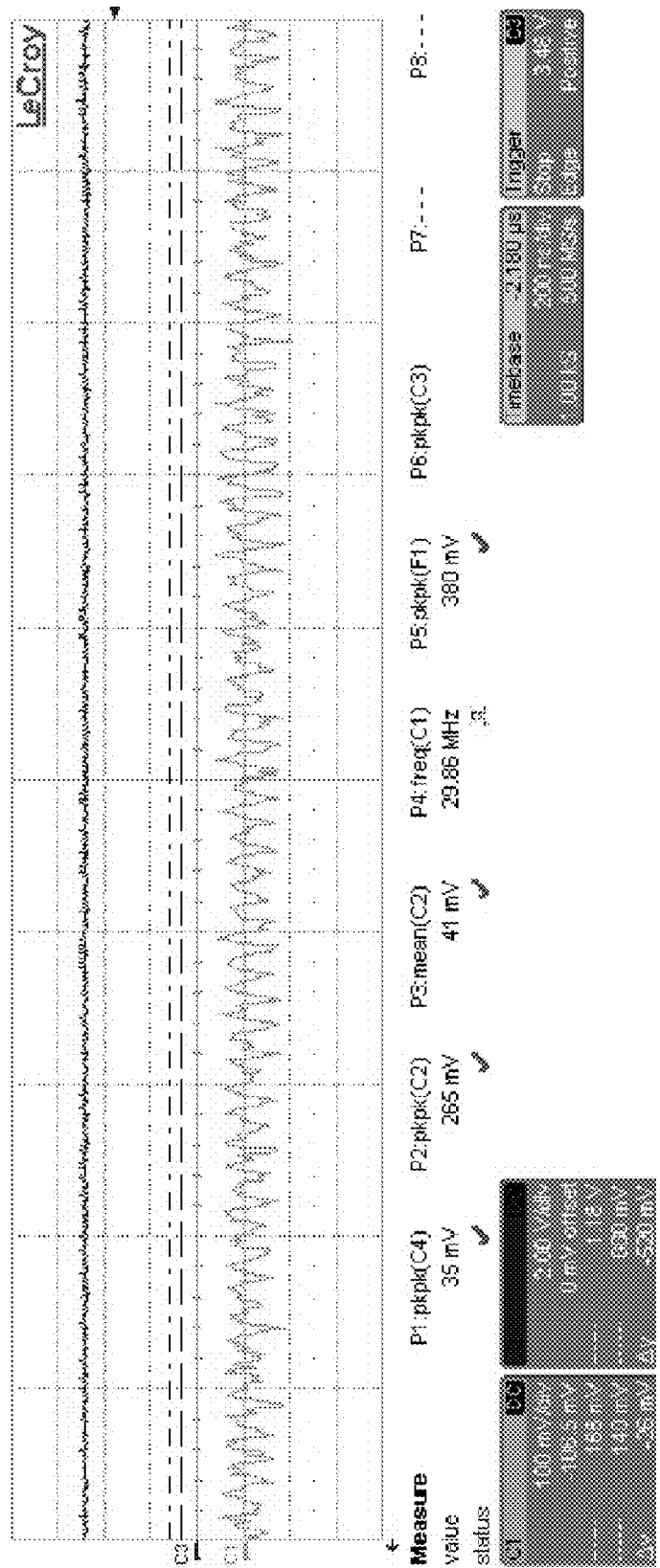
FIG. 9a shows a readback signal of a written track obtained from a writing process carried out by a recording head at a frequency of about 30 MHz according to one embodiment.
Figure 9B:
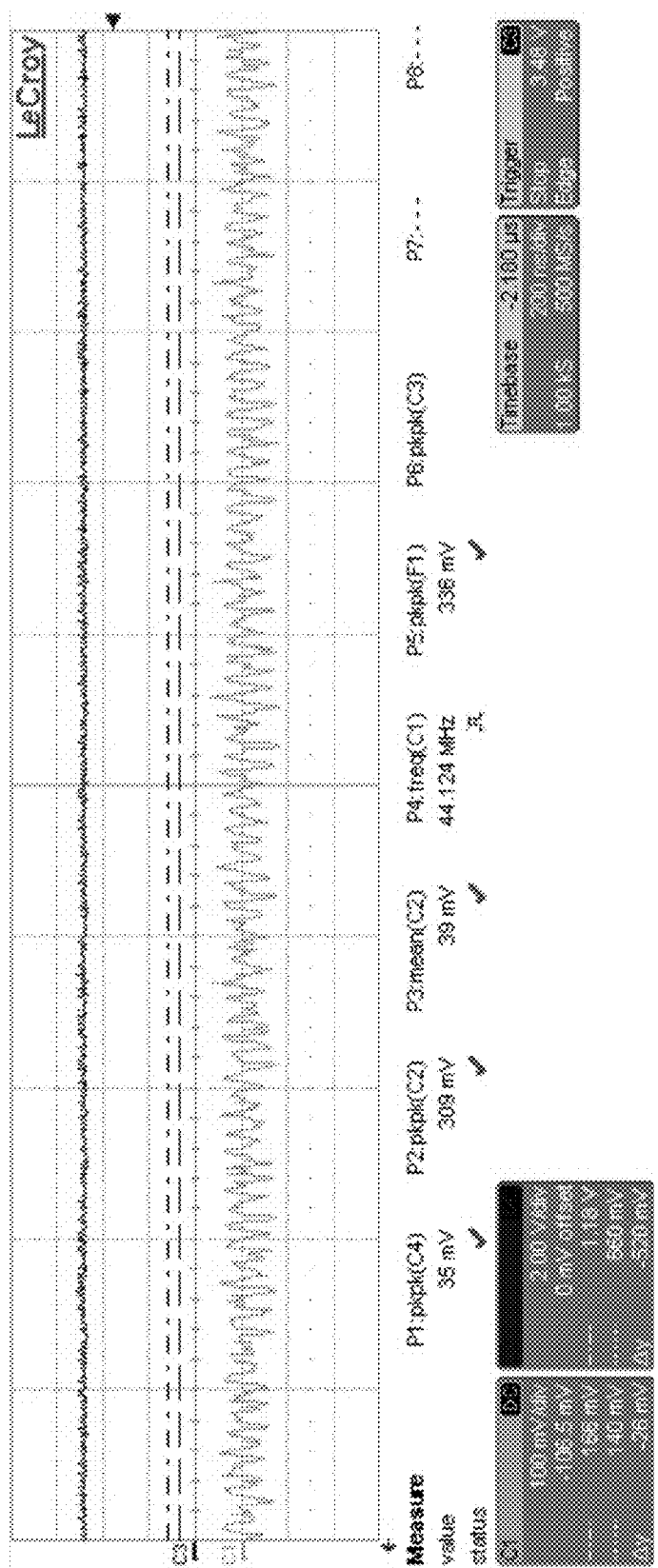
FIG. 9b shows a readback signal of a written track obtained from a writing process carried out by a recording head at a frequency of about 40 MHz according to one embodiment.

In one embodiment, the recording head 204 can be used in a spinstand for writing on a media of a high coercivityswitching field (e.g. media 800 of FIG. 8a). FIG. 9a shows a readback signal of a written track obtained from a writing process carried out by the recording head 204 at a frequency of about 30 MHz. FIG. 9b shows a readback signal of a written track obtained from a writing process carried out by the recording head 204 at a frequency of about 40 MHz. FIGS. 9a and 9b show that the recording head 204 is capable of writing on the high coercivity media 800 in a spinstand application.

Figure 1:
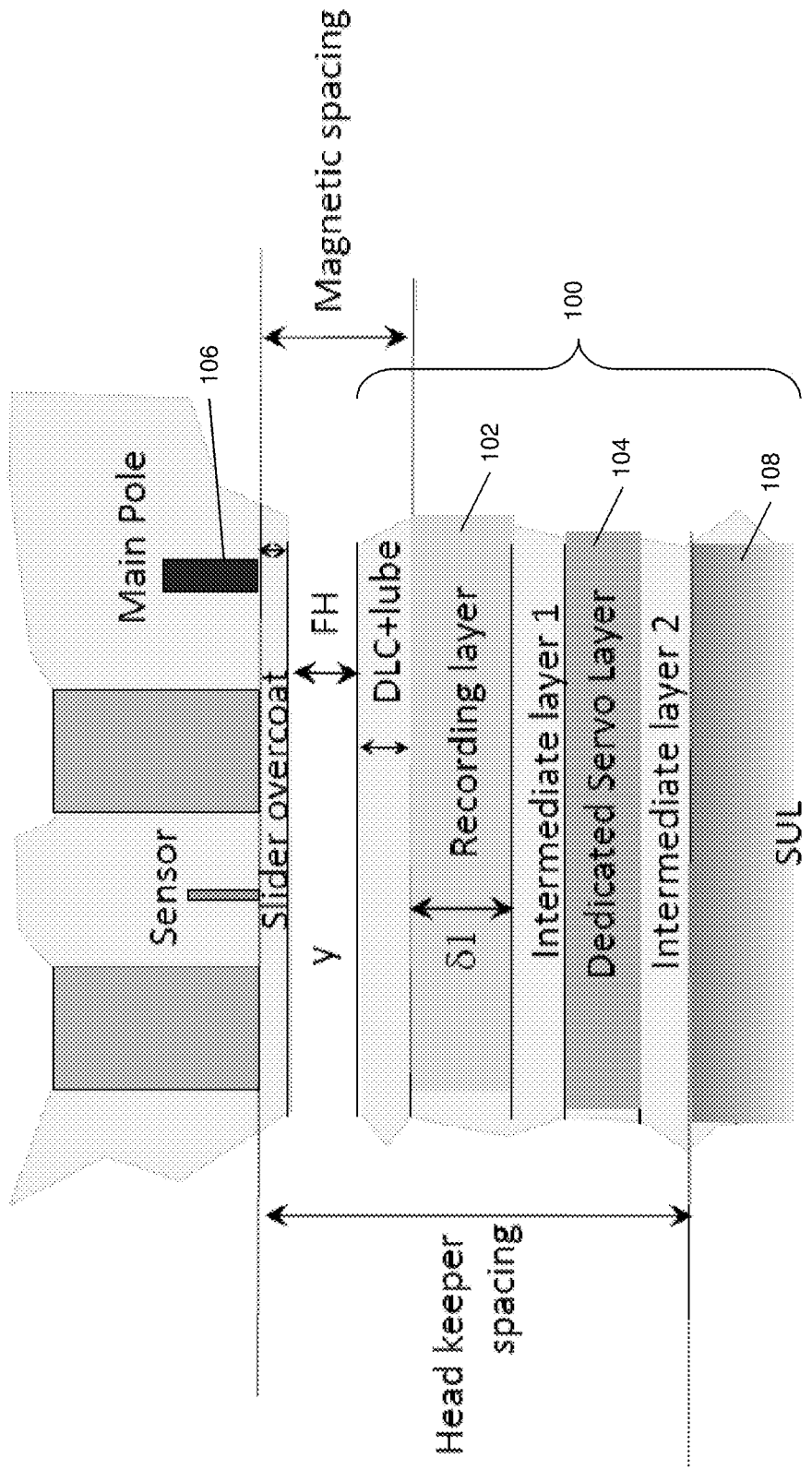
FIG. 1 shows a schematic diagram of a dedicated servo media.
Figure 10A:
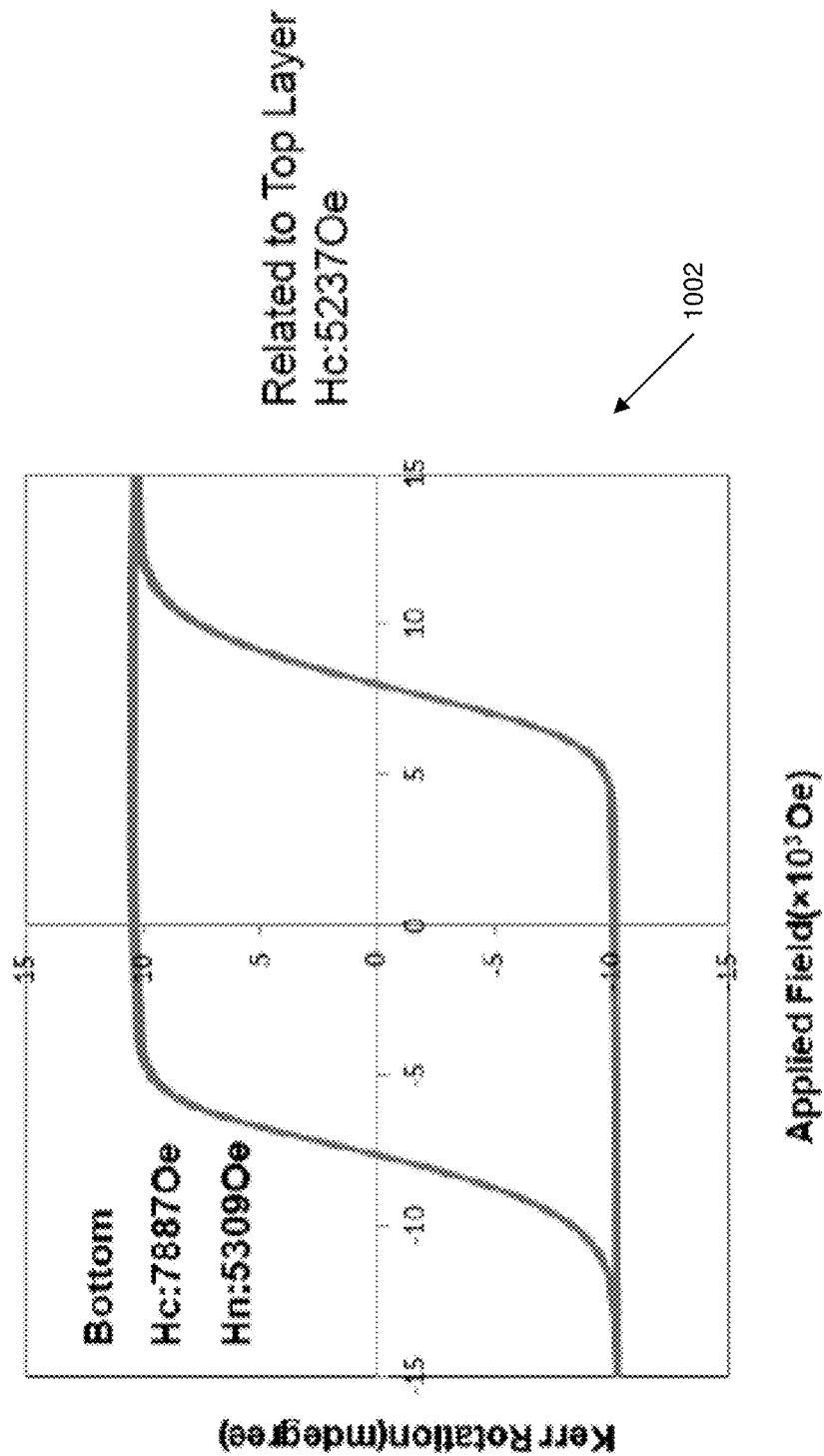
FIG. 10a shows a plot of a hysteresis loop of a servo layer of a dedicated servo media.

In one embodiment, the recording head 204 can be used in a drag tester or on a spinstand for writing on the dedicated servo media 100 shown in FIG. 1. FIG. 10a shows a plot 1002 of a hysteresis loop of the servo layer 104 of the dedicated servo media 100. The coercivity of the servo layer 104 is about 7,887 Oe. The nucleation field $H_n$ of the servo layer 104 is about 5,309 Oe. The coercivity $H_c$ of the magnetic data layer 102 of the conventional media 100 is about 5,237 Oe.

Figure 10B:
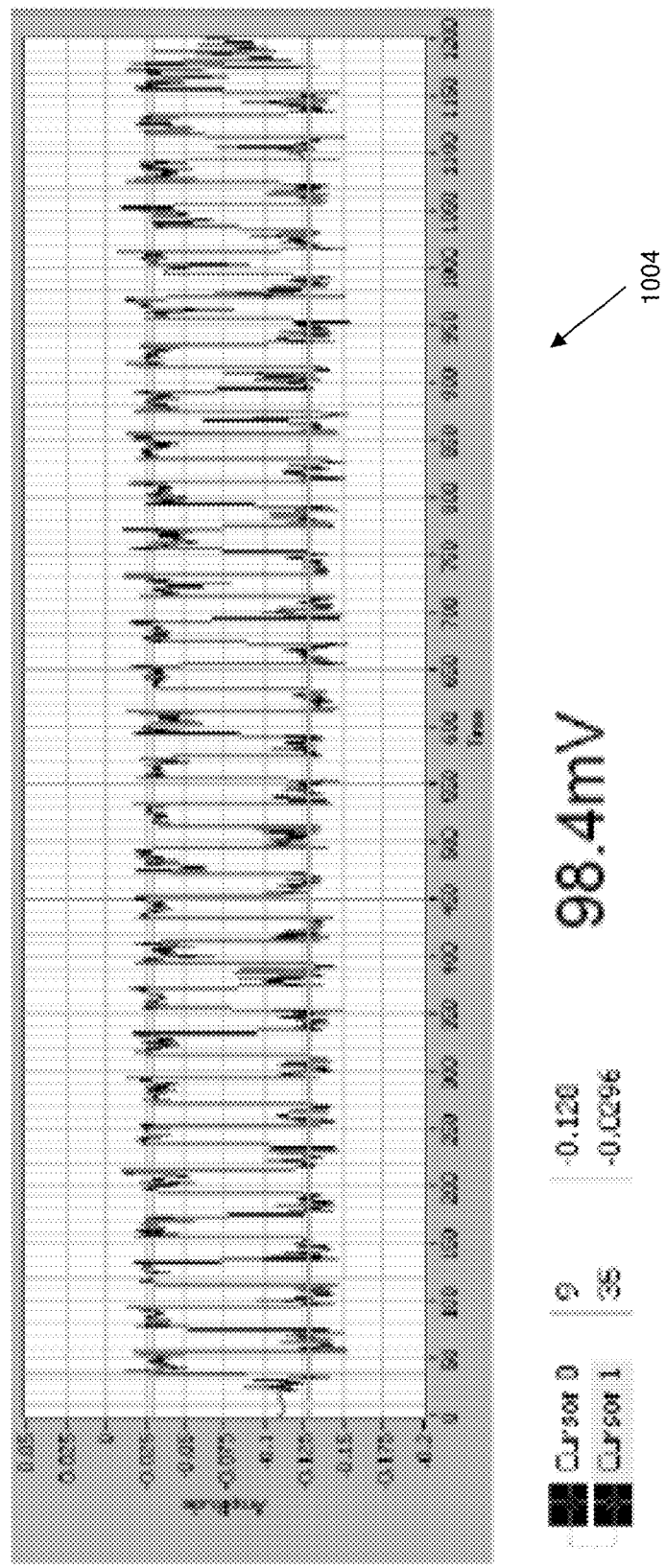
FIG. 10b shows a plot of voltage amplitude plotted against time obtained from a readback process on a dedicated servo media according to one embodiment.

FIG. 10b shows a plot 1004 of voltage amplitude plotted against time obtained during a readback process on a written track on the media 100. The track was written using the recording head 204 in a writing process. In one embodiment, every bit of information written on the servo layer 104 may occupy about 1 μm in down track direction on the servo layer 104.

Figure 11:
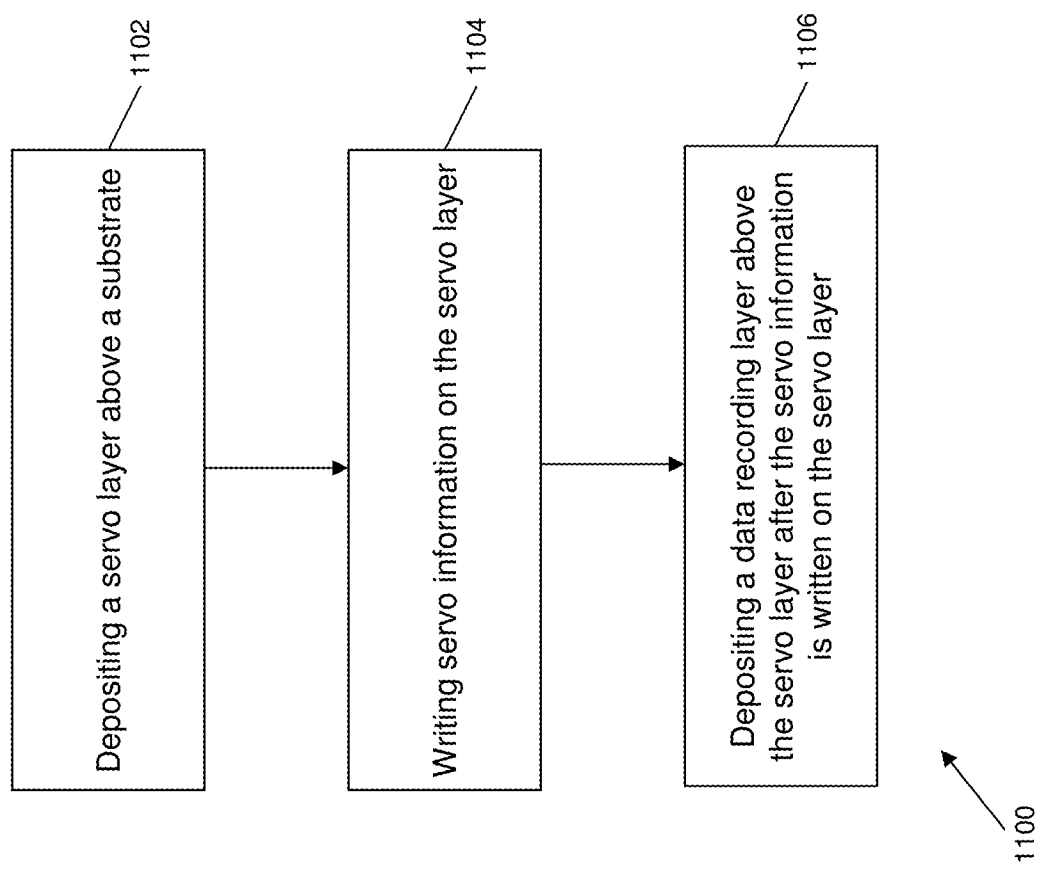
FIG. 11 shows a flowchart of fabricating a media according to one embodiment.

FIG. 11 shows a flowchart 1100 of fabricating a media. At 1102, a servo layer is deposited above a substrate. At 1104, servo information is written on the servo layer. At 1106, a data recording layer is deposited above the servo layer after the servo information is written on the servo layer.

Figure 12:
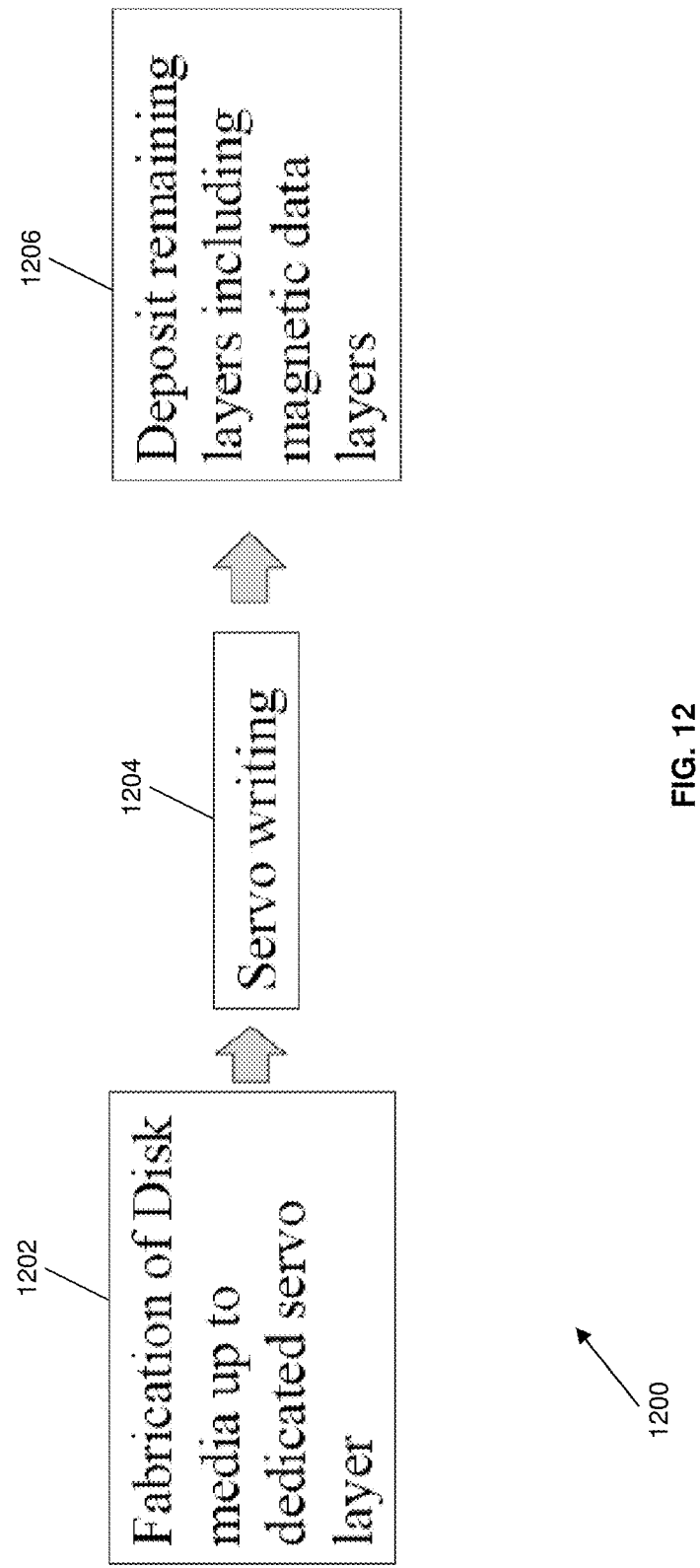
FIG. 12 shows a flowchart of fabricating a media according to one embodiment.

FIG. 12 shows a process of 1200 of fabricating a media. At 1202, a media, e.g. in a form of a disk, may be fabricated up to a servo layer. In one embodiment, a soft under-layer may be deposited on a substrate. A first intermediate layer may be deposited on the soft under-layer. The servo layer may be deposited on the first intermediate layer. At 1204, servo writing may be carried out. Servo information may be written on the servo layer. At 1206, the remaining layers including magnetic data layers may be deposited. In one embodiment, a second intermediate layer may be deposited on the servo layer. A data recording layer may be deposited on the second intermediate layer.

In one embodiment, writing servo information on the servo layer may include using a recording head comprising a dimension sized to produce a magnetic writing field to write servo information on the servo layer. The recording head may be the recording head 204 as described above.

Figure 13:
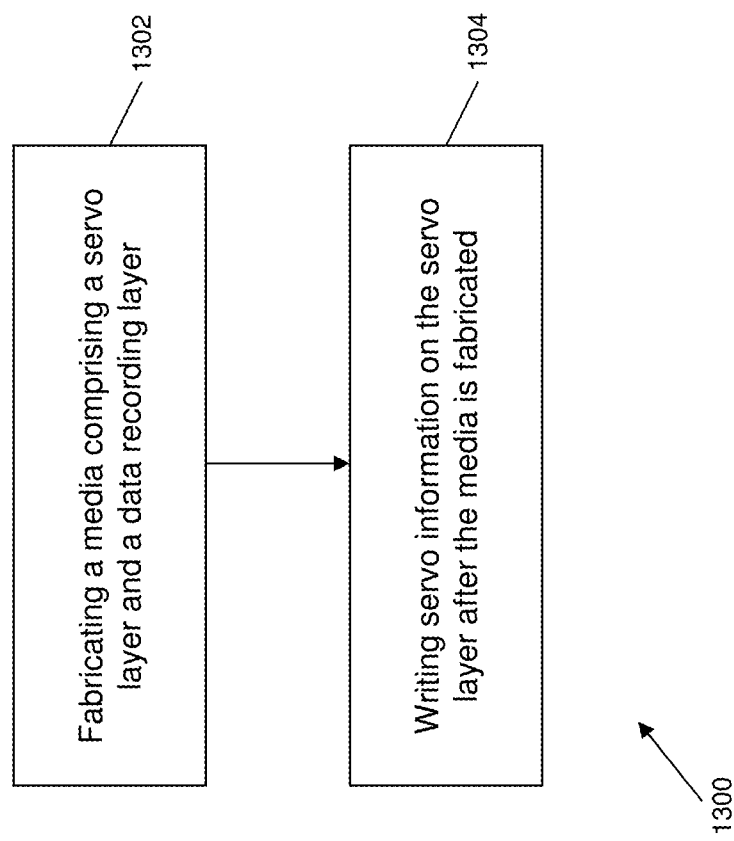
FIG. 13 shows a flowchart of a method of servo writing according to one embodiment.

In one embodiment, servo information is written on a servo layer of a media after the entire media is fabricated. FIG. 13 shows a flowchart 1300 of a method of servo writing. At 1302, a media including a servo layer and a data recording layer is fabricated. The data recording layer may be disposed above the servo layer. At 1304, servo information is written on the servo layer after the media is fabricated.

In one embodiment, writing servo information on the servo layer may include using a recording head comprising a dimension sized to produce a magnetic writing field to write servo information on the servo layer. The recording head may be the recording head 204 as described above.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A device comprising:
a recording medium comprising a servo layer and a data recording layer, wherein the servo layer comprises
a substrate,
an adhesion layer disposed on the substrate,
a magnetic under-layer disposed on the adhesion layer,
a seed layer disposed on the magnetic under-layer, and
an intermediate layer disposed on the seed layer,
wherein the data recording layer is disposed on the intermediate layer;
a first recording head comprising a first side, wherein the first side faces the servo layer and has a first width and a first length, wherein the first width is sized for producing a magnetic field to write servo information on the servo layer, wherein the servo layer comprises a first servo track, a second servo track and a third servo track, wherein a portion of the first servo track is overlapped by the second servo track, and wherein a portion of the second servo track is overlapped by the third servo track; and
a second recording head configured to produce a magnetic field to write data on the data recording layer, wherein the second recording head has a second side facing the data recording layer, wherein the second side has a second width and a second length, wherein (i) the second width of the second side is less than the first width of the first side, or (ii) the second length of the second side is less than the first length of the first side.

2. The device of claim 1, wherein the data recording layer is disposed between the first recording head and the servo layer.

3. The device of claim 1, wherein the first recording head is a longitudinal ring recording head.

4. The device of claim 1, wherein the first recording head is a single pole perpendicular magnetic recording head.

5. The device of claim 1, wherein the first recording head is a shingled recording head.

6. The device of claim 1, wherein the device is configured to adjust a writing current of the second recording head.

7. The device of claim 6, wherein the second recording head is configured to adjust the magnetic field generated by the second recording head when the writing current is adjusted.

8. The device of claim 7, wherein the magnetic field generated by the second recording head is smaller than the magnetic field generated by the first recording head.

9. The device of claim 1, wherein the first recording head or the second recording head is a disk certification head.

10. The device of claim 1, wherein the device comprises a spinstand, a disk certifier or a drag tester.

11. The device of claim 1, wherein the second length of the second side is less than the first length of the first side.

12. The device of claim 11, wherein the second width of the second side is less than the first width of the first side.

13. The device of claim 1, wherein:
the substrate comprises glass;
the adhesion layer comprises tantalum;
the magnetic under-layer comprises iron, tantalum and carbon;
the seed layer comprises chromium and ruthenium; and
the intermediate layer comprises titanium and nickel.

14. The device of claim 13, wherein the data recording layer comprises iron, platinum, carbon and silver.

15. A method of fabricating a medium, the method comprising:
depositing a servo layer above a substrate;
writing servo information on the servo layer; and
depositing a data recording layer above the servo layer after the servo information is written on the servo layer, wherein writing servo information on the servo layer comprises using a recording head comprising a width sized to produce a magnetic writing field to write servo information on the servo layer.

16. A method of writing servo information on a recording medium, the method comprising:
fabricating the recording medium to include a servo layer and a data recording layer, wherein the data recording layer is disposed on the servo layer, and wherein the fabricating of the recording medium comprises
fabricating the servo layer including
providing a substrate,
disposing an adhesion layer on the substrate,
disposing a magnetic under-layer on the adhesion layer,
disposing a seed layer on the magnetic under-layer, and
disposing an intermediate layer on the seed layer, and
disposing the data recording layer on the intermediate layer;
writing servo information on the servo layer via a first recording head, wherein the first recording head includes a first side, wherein the first side faces the servo layer and has a first width and a first length, wherein the first width is sized to produce a magnetic field to write the servo information on the servo layer, wherein the servo layer comprises a first servo track, a second servo track and a third servo track, wherein a portion of the first servo track is overlapped by the second servo track, and wherein a portion of the second servo track is overlapped by the third servo track; and
writing data on the data recording layer via a second recording head, wherein the second recording head comprises a second side, wherein the second side faces the data recording layer and has a second width and a second length, wherein the second width is sized for producing a magnetic field to write the data on the data recording layer, and wherein (i) the second width of the second side is less than the first width of the first side, or (ii) the second length of the second side is less than the first length of the first side.

17. The method of claim 16, wherein the second length is less than the first length.

18. The method of claim 17, wherein the second width is less than the first width.

19. A device comprising:
a recording medium comprising a servo layer and a data recording layer;
a first recording head comprising a first side, wherein the first side faces the servo layer and has a first width and a first length, wherein the first width is sized for producing a magnetic field to write servo information on the servo layer, wherein the servo layer comprises a first servo track, a second servo track and a third servo track, wherein a portion of the first servo track is overlapped by the second servo track, and wherein a portion of the second servo track is overlapped by the third servo track; and
a second recording head configured to produce a magnetic field to write data on the data recording layer, wherein the second recording head has a second side facing the data recording layer, wherein the second side has a second width and a second length, wherein (i) the second width of the second side is less than the first width of the first side, or (ii) the second length of the second side is less than the first length of the first side,
wherein the data recording layer is deposed on the servo layer subsequent to the servo information being written on the servo layer.

20. A method of writing servo information on a recording medium, the method comprising:
fabricating the recording medium to include a servo layer and a data recording layer, wherein the data recording layer is disposed on the servo layer;
writing servo information on the servo layer via a first recording head, wherein the first recording head includes a first side, wherein the first side faces the servo layer and has a first width and a first length, wherein the first width is sized to produce a magnetic field to write the servo information on the servo layer, wherein the servo layer comprises a first servo track, a second servo track and a third servo track, wherein a portion of the first servo track is overlapped by the second servo track, and wherein a portion of the second servo track is overlapped by the third servo track;
writing data on the data recording layer via a second recording head, wherein the second recording head comprises a second side, wherein the second side faces the data recording layer and has a second width and a second length, wherein the second width is sized for producing a magnetic field to write the data on the data recording layer, and wherein (i) the second width of the second side is less than the first width of the first side, or (ii) the second length of the second side is less than the first length of the first side; and
disposing the data recording layer on the servo layer subsequent to writing the servo information of the servo layer.

* * * * *